No. 725,201. PATENTED APR. 14, 1903.
J. B. BARTHOLOMEW.
CULTIVATOR.
APPLICATION FILED APR. 15, 1902.
NO MODEL. 2 SHEETS—SHEET 1.
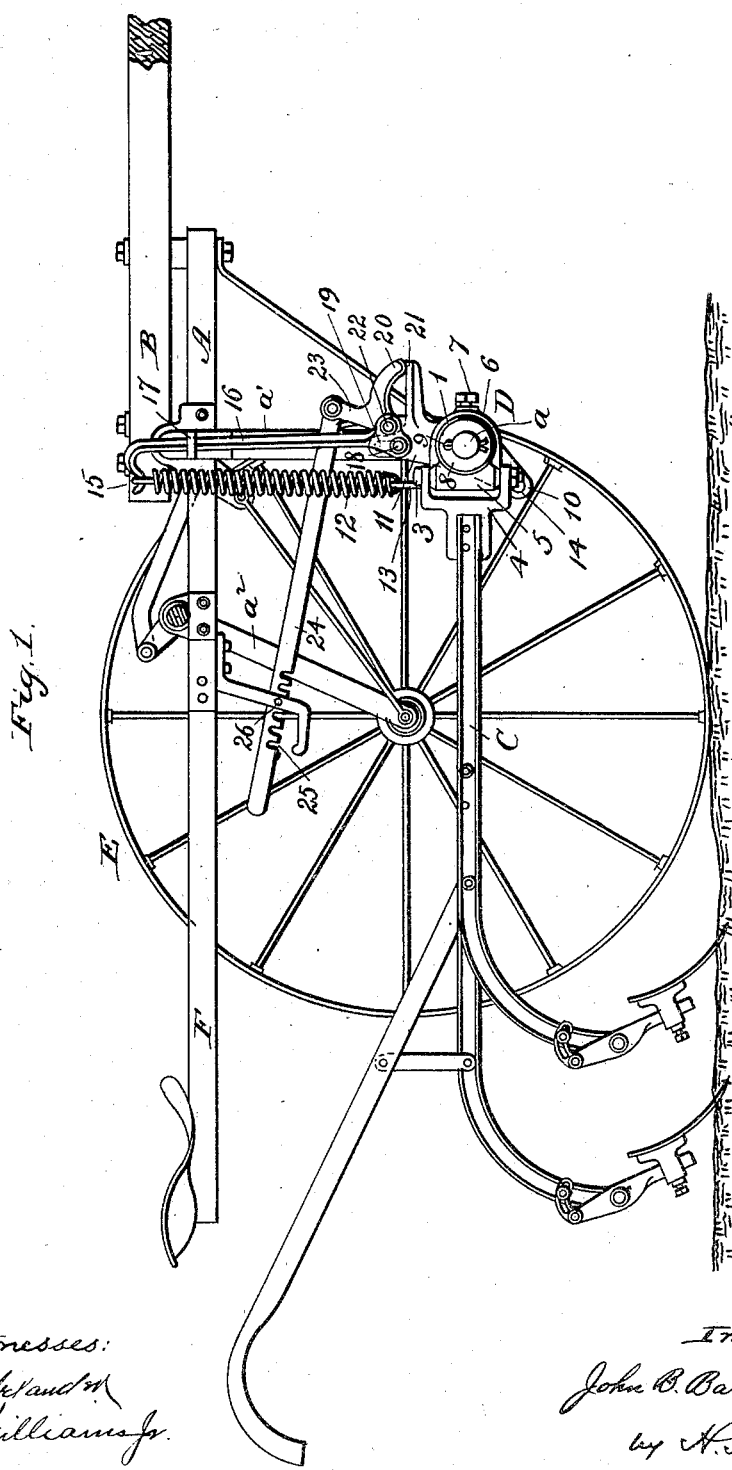

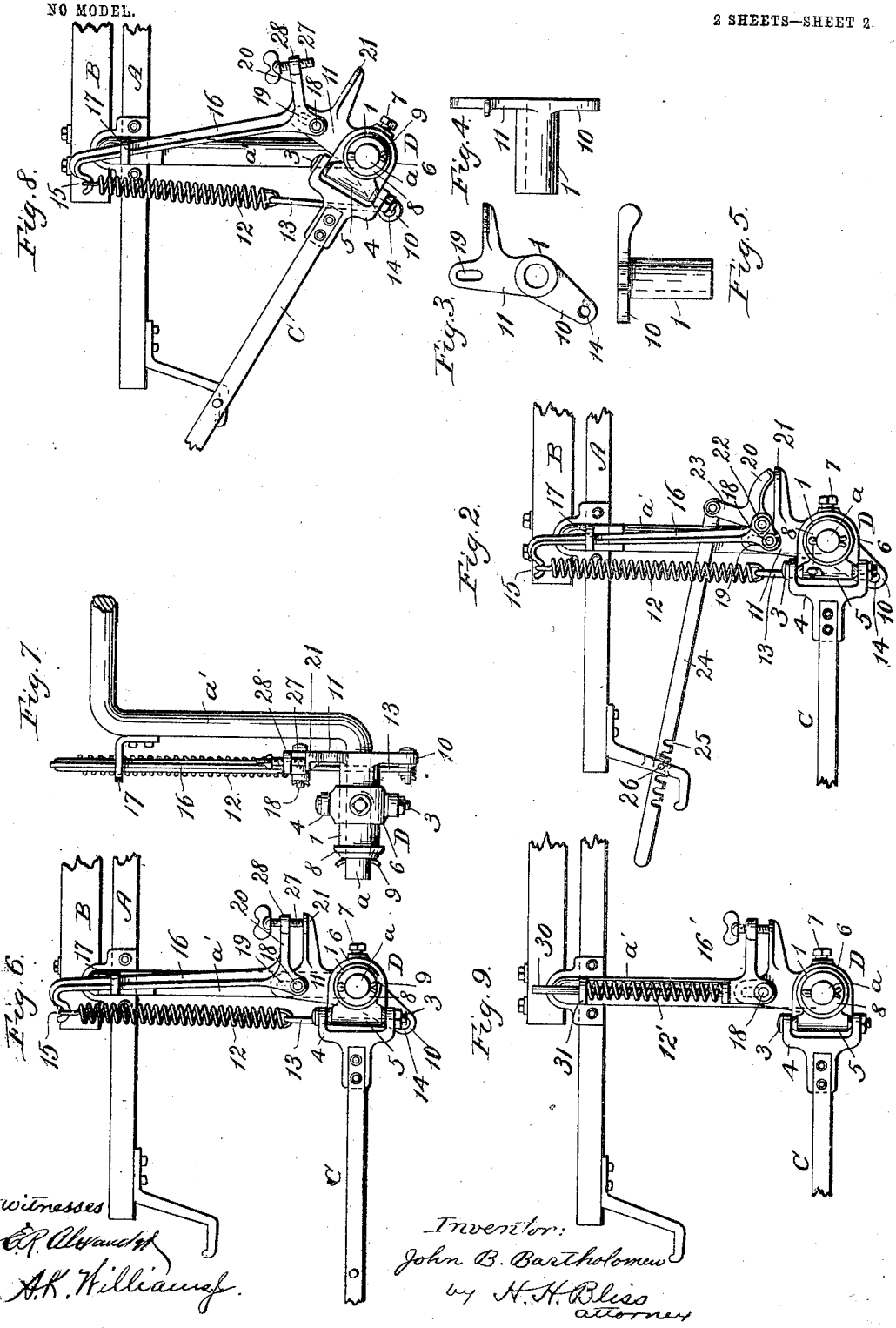

UNITED STATES PATENT OFFICE.

JOHN B. BARTHOLOMEW, OF PEORIA, ILLINOIS, ASSIGNOR TO AVERY MANUFACTURING COMPANY, OF PEORIA, ILLINOIS, A CORPORATION OF ILLINOIS.

CULTIVATOR.

SPECIFICATION forming part of Letters Patent No. 725,201, dated April 14, 1903.

Application filed April 15, 1902. Serial No. 103,028. (No model.)

*To all whom it may concern:*

Be it known that I, JOHN B. BARTHOLOMEW, a citizen of the United States, residing at Peoria, in the county of Peoria and State of Illinois, have invented certain new and useful Improvements in Cultivators, of which the following is a specification, reference being had therein to the accompanying drawings.

This invention relates to improvements in cultivators and similar implements.

The object is to provide the plow-beam with spring-power mechanism so connected with the beam as to lift it when desired to a non-working position and to control it yieldingly at the desired depth of cultivation when the beam is in working position.

A further object is to combine with such a spring-power mechanism means by which the resilient efficiency of the same is increased when the plow-beam is in its working position.

A further object is to provide manually-operable controlling means for such mechanism so located within reach of the driver that he may from time to time vary the beam-controlling efficiency of the spring-power mechanism while the plows or shovels are in operation and may do this from his usual working position.

In order to make the invention more clearly understood, I have illustrated certain preferred forms of the same in the accompanying drawings, in which—

Figure 1 is a side view of a cultivator embodying my invention and comprising the feature of manual control at will above referred to. Fig. 2 is a similar view of the beam-controlling mechanism with a portion of the main frame and plow-beam. Figs. 3, 4, and 5 are views of the sleeve or part with its arms as preferably constructed, through which the spring-power is applied to the plow-beam. Figs. 6, 7, and 8 illustrate another embodiment of the invention, Fig. 8 showing the plow-beam elevated to non-working position. Fig. 9 is a side view of another embodiment of the invention.

Referring to the drawings, A is the main frame of the cultivator or like implement; B, the tongue or draft device; C, the plow-beam, of which there may be any desired or practicable number, having a coupling D with the spindle $a$ of the arch $a'$ of the main frame, by means of which coupling the beam may swing vertically and may also swing freely and directly in planes from side to side, as distinguished from constructions in which the plow-beam is so suspended as to swing in curves, moving up and down as it moves laterally, and E the wheels carried by the arch $a^2$ of the main frame. Though not necessary to the working of my invention hereinafter described, it is preferable that the wheels be longitudinally adjustable by the forward-and-backward swinging of the arch $a^2$, actuated by the seat-support F and suitable connections, as described in my Patent No. 701,007, dated May 27, 1902.

The coupling D comprises a sleeve or pipe-box 1, adapted to turn on the spindle $a$ and having a substantially vertical axis for the horizontal swinging of the beam. This axis is furnished by a pivot-bolt 3, passing through the ears of a yoke 4, attached to the forward end of the plow-beam, and also through a bearing 5 on the rear side of a collar 6. The latter fits on the sleeve 1, may be laterally adjusted thereon, and is secured in place by a set-screw 7 or other appropriate device. The sleeve 1 is confined on the spindle $a$ by a washer 8 and pin 9.

According to the preferred form of my invention the spring-power mechanism for lifting and controlling the beam comprises what is known as a "double-acting" spring, the movements of both ends of which transmit power and movement to the beam. The pipe-box or sleeve 1 above referred to is adapted for this form of spring, as shown in Figs. 3, 4, and 5, having a downwardly and rearwardly extending arm 10 and an upwardly-extending arm 11. The said spring (shown at 12) has its lower end connected with the arm 10, as by a link 13, engaging or hooking into an eye 14 in said arm. The upper end of the spring is hooked or connected at 15 with a lever and push-bar 16, directed in its movements by a guide and fulcrum 17 on the arch $a'$ or other suitable part of the main frame and pivotally connected at 18 with the arm 11. The action of the spring 12 is to draw upward at its lower end upon the arm 10 and also force the other arm, 11, forward and downward through the medium of the bar 16, both of these exertions of power tending to turn the sleeve 1 and lift the plow-beam in a known manner. As thus far described the mechanism has simply a beam-lifting function. My improvements about to be described enable such a double-acting spring mechanism also to control and regulate the beam and shovels in their working position with great power and efficiency. I provide means whereby the lever and push-bar 16 of the double-acting spring mechanism has a substantially longitudinal movement relative to the arm 11 in addition to its pivotal movement thereon. A convenient means of attaining this result is to form the arm 11 with a slot 19, extending in directions more or less toward and from the main axis of the arm, which is at $a$. In said slot is fitted the pivot 18, on which the lower end of the bar 16 turns. I further provide a suitable fulcrum which will at the proper time cause the bar 16 to move more or less away from the arm 11 and extend the spring 12, the pivot 18 at the same time moving in the slot 19. Such a fulcrum is furnished by an arm 20, which is adapted to be arrested when the plow-beam arrives at substantially the working position and the parts 16 and 11 have moved so as to bring the pivot 18 about in line with the spindle $a$ and the guide 17 by an abutment 21, moving with the arm 11 or otherwise suitably supported to arrest the arm 20 and act as a stop for the same. The arm 20 or equivalent device may be variously constructed and supported. In Figs. 1 and 2 it is pivotally connected at 22 with the bar 16 and has means, such as an arm 23 and handle-bar 24, by which it may be adjusted from the driver's seat, so as to meet the abutment 21 at an earlier or later time, according to the desired depth of cultivation. The handle 24 may be secured in its adjusted position by notches 25, adapted to engage a pin 26, carried by a part of the main frame, these devices acting as a lock operable at will to adjust and secure the beam-controlling fulcrum. In Figs. 6, 7, and 8 the arm 20 is provided with an adjustable fulcrum or stop in the form of a set-screw 27, working in a screw-threaded bearing 28 in said arm and adapted to be set nearer to or farther from the abutment 21 for the purposes above described. In either construction when the meeting of the arms 20 and 21 prevents any further relative turning of the parts 11 and 16 the plow-beam has arrived at substantially its working-point, where it will be yieldingly supported with great power and efficiency by the lifting-spring 12. Any further downward movement of the plow-beam is not positively stopped, for the parts 16 and 11 may still turn relative to each other to a limited extent on the fulcrum already referred to, formed by the parts 20 and 21 and permitted by the movement of the pivot 18 in the slot 19; but this further downward movement of the plow-beam and relative turning of the parts 11 and 16 is strongly resisted by the spring 12, which is already under nearly its maximum tension and is additionally extended by said further movement and accompanying elevation of the bar 16 and spring suspension-point 15.

In Fig. 9 the lifting-spring (shown at 12′) is of the ordinary compression type guided on a rod 30 and acting between a lug 31 on the main frame and a part 16′, which has a turning and sliding movement on the pivot 18, such as has been already described in connection with the part 16. In other respects the construction and operation of the devices shown in Fig. 9 are substantially the same as those of Figs. 6, 7, and 8.

What I claim is—

1. In a cultivator or like implement, the combination of the main frame, the plow-beam coupled therewith to swing vertically and to swing freely and directly in planes from side to side, a combined lifting and regulating spring connected with said beam for lifting the same and controlling it in working position, and means manually operable by the driver from his normal position while the plows are in action for adjusting the efficiency of the spring-power which controls the working position of the beam, whereby the depth of action of the plows may be regulated.

2. In a cultivator or like implement, the combination of the main frame, the plow-beam coupled therewith to swing vertically and laterally, an arm connected with the beam to swing and control the latter vertically and having a slot 19, a push-bar 16 pivotally connected with said slot, and a spring 12 connected with said push-bar to force the latter toward said arm and also connected with the arm independently of the push-bar, said push-bar and arm having a fulcrum means eccentric to their pivotal connection, substantially as set forth.

3. In a cultivator or like implement, the combination of the main frame, the plow-beam coupled therewith to swing vertically and laterally, a double-acting spring-power mechanism connected with the beam for lifting the same and controlling it in working position, and means manually operable by the driver from his normal position while the plows are in action for adjusting the efficiency of the spring-power which controls the working position of the beam, substantially as set forth.

4. In a cultivator or similar implement, the combination of the main frame, the plow-beam coupled therewith to swing vertically and laterally, the lifting-spring adapted to support the beam or the major part of the weight thereof when it is rising from its working position to its carrying position, and means for increasing the efficiency of the spring when the plows are in working position, said means being operable by the driver from his normal position.

5. In a cultivator or similar implement, the combination of the main frame, the plow-beam coupled therewith to swing vertically and laterally, the lifting-spring acting upwardly on the beam when it is rising from its working position to its carrying position, spring-operated parts through which said spring acts on the beam having a fulcrum adapted to come into operation to increase the efficiency of the spring when the beam is in working position, and manually-controlled means extending to the driver's position whereby the time of operation of said fulcrum relative to the position of the beam and plows may be determined at will, substantially as set forth.

6. In a cultivator or similar implement, the combination of the main frame, the plow-beam coupled therewith to swing vertically and laterally, a double-acting spring-power mechanism comprising spring-operated parts through which said spring acts on the beam, said parts having a pivotal connection and also being relatively slidable to further extend the lifting-spring, and a rearwardly-extending handle for determining at will the time of such further extension of the spring relative to the height of the beam and plows, substantially as set forth.

7. In a cultivator or like implement, the combination of the main frame, the plow-beam coupled therewith to swing vertically and laterally, a lifting-spring, connections between the one end of said spring and the beam tending to lift the beam, and connections between the other end of said spring and the beam also tending to lift the beam, one of said connections being extensible, when the beam is in working position, to further extend said spring.

8. In a cultivator or like implement, the combination of the main frame, the plow-beam coupled therewith to swing vertically and laterally, a lifting-spring, connections between the one end of said spring and the beam tending to lift the beam, connections between the other end of said spring and the beam also tending to lift the beam, one of said connections being extensible, when the beam is in working position, to further extend said spring, and means whereby such extensible connection may be operated at will to determine the average depth at which the plows will be regulated by said spring, substantially as set forth.

9. In a cultivator or like implement, the combination of the main frame, the plow-beam coupled therewith to swing vertically and laterally, a double-acting spring-power mechanism connected with the beam for lifting the same, and means whereby said mechanism is caused to regulate the beam when in working position, substantially as set forth.

In testimony whereof I affix my signature in presence of two witnesses.

JOHN B. BARTHOLOMEW.

Witnesses:
ELVAN M. VOORHEES,
ALBERT L. GREGORY.